(12) United States Patent
Tanaka

(10) Patent No.: US 11,113,014 B2
(45) Date of Patent: Sep. 7, 2021

(54) INFORMATION PROCESSING APPARATUS DETERMINES WHETHER IMAGE PROCESSING DEVICE SUITABLE TO EXECUTE PROCESSING ACCORDING TO RELIABILITY AND CONFIDENTIALITY INFORMATION

(71) Applicant: FUJI XEROX CO., LTD., Tokyo (JP)

(72) Inventor: Hironori Tanaka, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 16/822,131

(22) Filed: Mar. 18, 2020

(65) Prior Publication Data
US 2021/0081152 A1 Mar. 18, 2021

(30) Foreign Application Priority Data
Sep. 18, 2019 (JP) .............................. JP2019-169789

(51) Int. Cl.
G06F 21/60 (2013.01)
G06F 3/12 (2006.01)
H04W 12/03 (2021.01)

(52) U.S. Cl.
CPC ............ *G06F 3/1232* (2013.01); *G06F 3/126* (2013.01); *G06F 3/1222* (2013.01); *G06F 3/1238* (2013.01); *G06F 21/608* (2013.01); *H04W 12/03* (2021.01)

(58) Field of Classification Search
None
See application file for complete search history.

(56) References Cited

U.S. PATENT DOCUMENTS

| 8,561,128 | B2 | 10/2013 | Hirahara |  |
|---|---|---|---|---|
| 9,648,041 | B2* | 5/2017 | Nishimura | .............. H04L 63/20 |
| 2006/0170953 | A1* | 8/2006 | Okamoto | .............. G06F 3/1204 358/1.15 |
| 2010/0214589 | A1* | 8/2010 | Fukano | ................. G06F 21/608 358/1.14 |
| 2015/0116752 | A1* | 4/2015 | Suzuki | ................. G06F 3/1238 358/1.14 |
| 2015/0124279 | A1* | 5/2015 | Iizuka | ................. H04N 1/2104 358/1.14 |
| 2017/0242742 | A1* | 8/2017 | Akiba | ................. G06F 11/0787 |

FOREIGN PATENT DOCUMENTS

| JP | 2004-94401 A | 3/2004 |
|---|---|---|
| JP | 2008-35501 A | 2/2008 |
| JP | 2008-102871 A | 5/2008 |

* cited by examiner

*Primary Examiner* — Haris Sabah
(74) *Attorney, Agent, or Firm* — Oliff PLC

(57) ABSTRACT

An information processing apparatus includes an execution request obtainer, a reliability information obtainer, a confidentiality-degree determiner, and a processing execution judger. The execution request obtainer obtains an execution request to execute processing using an image processing device. The reliability information obtainer obtains reliability information concerning the reliability of the image processing device. The confidentiality-degree determiner determines the degree of confidentiality of subject data to be processed in response to the execution request. The processing execution judger judges whether the image processing device is suitable to execute processing in response to the execution request, based on the reliability information and the degree of confidentiality.

12 Claims, 8 Drawing Sheets

| ID | DEGREE OF CONFIDENTIALITY | INSTALLATION LOCATION | ADMINISTRATOR | COMMUNICATION ENCRYPTION | HDD ENCRYPTION | HDD INITIALIZATION | IMAGE LOG | JUDGING RESULT |
|---|---|---|---|---|---|---|---|---|
| 1 | HIGH | OUTSIDE | OUTSIDE | N/A | | | | NG |
| 2 | HIGH | IN-HOUSE | OUTSIDE | N/A | | | | NG |
| 3-1 | HIGH | OUTSIDE | IN-HOUSE | NO | NO | NO | NO | NG |
| 3-2 | HIGH | OUTSIDE | IN-HOUSE | YES | YES | YES | NO | OK |
| 3-3 | HIGH | OUTSIDE | IN-HOUSE | N/A | | | YES | NG |
| 4 | HIGH | IN-HOUSE | IN-HOUSE | N/A | | | | OK |

FIG. 3

| ID | DEVICE NAME | INSTALLATION LOCATION | ADMINISTRATOR | COMMUNICATION ENCRYPTION | HDD ENCRYPTION | HDD INITIALIZATION | IMAGE LOG |
|---|---|---|---|---|---|---|---|
| 1 | COMPANY A – SALES DEPT. | COMPANY A – FIRST FLOOR | COMPANY A | NO | NO | NO | NO |
| 2 | COMPANY A – DEVELOPMENT DEPT. | COMPANY A – SECOND FLOOR | COMPANY A | YES | YES | YES | YES |
| 3 | COMPANY B | COMPANY B – FIRST FLOOR | COMPANY B | YES | NO | NO | NO |
| 4 | CONVENIENCE STORE | YOKOHAMA-SHI | COMPANY C | YES | NO | NO | NO |

FIG. 4

| ID | DEGREE OF CONFIDENTIALITY | INSTALLATION LOCATION | ADMINISTRATOR | COMMUNICATION ENCRYPTION | HDD ENCRYPTION | HDD INITIALIZATION | IMAGE LOG | JUDGING RESULT |
|---|---|---|---|---|---|---|---|---|
| 1 | HIGH | OUTSIDE | OUTSIDE | | | N/A | | NG |
| 2 | HIGH | IN-HOUSE | OUTSIDE | | | N/A | | NG |
| 3-1 | HIGH | OUTSIDE | IN-HOUSE | NO | NO | NO | NO | NG |
| 3-2 | HIGH | OUTSIDE | IN-HOUSE | YES | YES | YES | NO | OK |
| 3-3 | HIGH | OUTSIDE | IN-HOUSE | | N/A | | YES | NG |
| 4 | HIGH | IN-HOUSE | IN-HOUSE | | | N/A | | OK |

INFORMATION PROCESSING APPARATUS DETERMINES WHETHER IMAGE PROCESSING DEVICE SUITABLE TO EXECUTE PROCESSING ACCORDING TO RELIABILITY AND CONFIDENTIALITY INFORMATION

CROSS-REFERENCE TO RELATED APPLICATIONS

This application is based on and claims priority under 35 USC 119 from Japanese Patent Application No. 2019-169789 filed Sep. 18, 2019.

BACKGROUND

(i) Technical Field

The present disclosure relates to an information processing apparatus and an image processing device.

(ii) Related Art

Various measures have been proposed to ensure security for the case of using an external device to execute processing, such as using an external image forming device to output an image via a network.

Japanese Unexamined Patent Application Publication No. 2008-35501 discloses the following image processing system. Read data or data input via a network is registered in a box. A security policy is set for the registered data and is then registered in a security server via a network.

Japanese Unexamined Patent Application Publication No. 2008-102871 discloses the following document management system that manages access to files. From among virtual security policies set for each device, a virtual security policy is selected. Based on the selected virtual security policy and authentication information concerning a user having set the virtual security policies, access right information for determining rights to access a file is obtained. Based on the access right information, the virtual security policy is converted into a real security policy that can be interpreted by the document management system. The converted real security policy is set in a file.

Japanese Unexamined Patent Application Publication No. 2004-94401 discloses the following security policy distribution system. The security policy distribution system includes a security server and a security client. The security server manages a common security policy to be applied to different types of multiple devices and also manages devices to which the common security policy is applied. The security client obtains the common security policy distributed from the security server and performs access control.

SUMMARY

When a user uses an image processing device outside the organization to which the user belongs, it may find it difficult to determine whether the image processing device is suitable for outputting data because the security level of the image processing device is unknown to the user.

Aspects of non-limiting embodiments of the present disclosure relate to enhancing the security when a user uses an image processing device outside the organization to which the user belongs.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including an execution request obtainer, a reliability information obtainer, a confidentiality-degree determiner, and a processing execution judger. The execution request obtainer obtains an execution request to execute processing using an image processing device. The reliability information obtainer obtains reliability information concerning the reliability of the image processing device. The confidentiality-degree determiner determines the degree of confidentiality of subject data to be processed in response to the execution request. The processing execution judger judges whether the image processing device is suitable to execute processing in response to the execution request, based on the reliability information and the degree of confidentiality.

BRIEF DESCRIPTION OF THE DRAWINGS

Exemplary embodiments of the present disclosure will be described in detail based on the following figures, wherein:

FIG. 3 is a table illustrating examples of reliability information;

FIG. 4 is a table illustrating examples of judgement standards based on the degree of confidentiality to judge whether an image processing device is suitable to execute processing;

DETAILED DESCRIPTION

Exemplary embodiments of the disclosure will be described below in detail with reference to the accompanying drawings.

[System Configuration]

Figure 1:
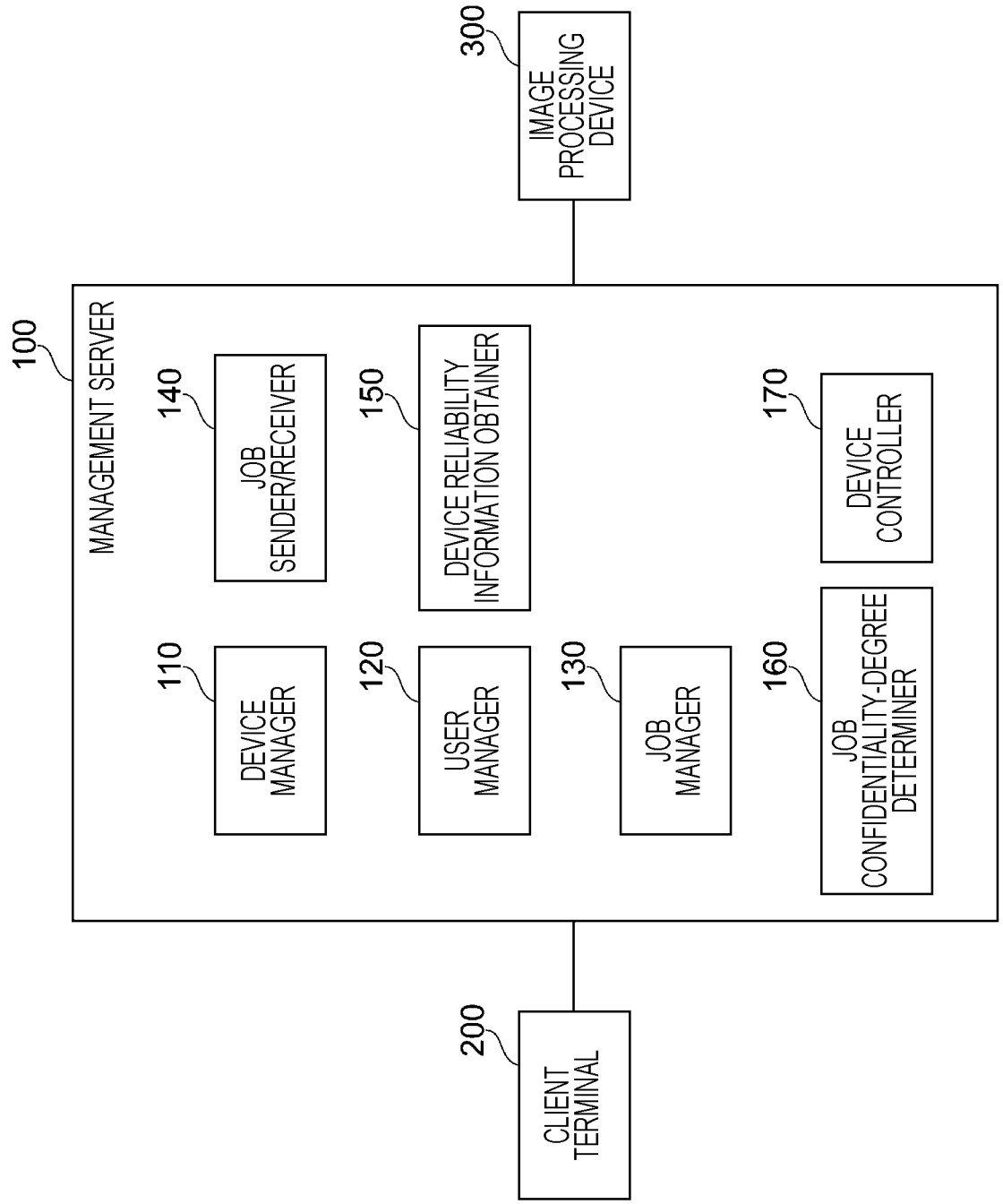
FIG. 1 is a schematic block diagram illustrating the overall configuration of an information processing system to which an exemplary embodiment is applied and also illustrating the functional configuration of a management server.

FIG. 1 is a schematic block diagram illustrating the overall configuration of an information processing system to which an exemplary embodiment is applied and also illustrating the functional configuration of a management server 100. The information processing system shown in FIG. 1 includes the management server 100, a client terminal 200, and an image processing device 300.

The management server 100 is a server that receives an execution request from the client terminal 200 and causes the image processing device 300 to execute processing. The management server 100 judges whether to let the image processing device 300 selected by the client terminal 200 execute processing, based on the reliability of the image processing device 300 and the degree of confidentiality of subject data. Processing execution control to be performed by the management server 100 will be discussed later.

The client terminal 200 is a device used by a user to send a request to execute data processing and to obtain the processing result of the image processing device 300. Examples of the client terminal 200 are a personal computer and an information terminal, such as a smartphone. A user operates the client terminal 200 to select the image processing device 300 to execute processing and provides an instruction to execute data processing with the use of the selected image processing device 300.

The image processing device 300 executes processing based on an execution request input by a user having operated the client terminal 200. The image processing device 300 is a multifunction device having a print function and a reading function, for example. By using the print function, the image processing device 300 performs image processing on a document file and prints an image of the document file. By using the reading function, the image processing device 300 reads an image formed on a medium, such as paper, and converts the read image into a document file.

[Functional Configuration of Management Server 100]

In the example shown in FIG. 1, the management server 100 includes a device manager 110, a user manager 120, a job manager 130, a job sender/receiver 140, a device reliability information obtainer 150, a job confidentiality-degree determiner 160, and a device controller 170. The management server 100 is implemented by a server constructed on a network.

The device manager 110 registers and manages information concerning the image processing device 300 (hereinafter called device information). The device information includes information for identifying the image processing device 300 to be managed (hereinafter called device identification information) and information concerning the reliability of the image processing device 300 obtained from the image processing device 300 (hereinafter called reliability information). More specifically, as the device identification information, the device name, device ID, IP address, and administrator concerning the image processing device 300 are registered. The reliability information is information concerning the environments and settings of the image processing device 300. Details of the reliability information will be discussed later. The above-described items of information are only examples. Each of the device identification information and the reliability information may include information other than the above-described items of information or include none of the above-described items of information. The reliability information may be obtained from the image processing device 300 or from a server which manages the image processing device 300, for example.

The user manager 120 registers and manages information concerning users of the image processing device 300 (hereinafter called user information). As the user information, the name, user ID, organization, and department of each user, for example, are registered. The user information is used for conducting user authentication, for example, to let a user use the image processing device 300. These items of information are only examples. The user information may include information other than the above-described items of information or include none of the above-described items of information.

The job manager 130 manages information concerning processing (job) to be executed by the image processing device 300 (hereinafter called job information). Job information includes information concerning each processing, such as the user having made an execution request, identification information concerning the image processing device 300 to execute processing, and processing completion time. In the case of printing processing, the management server 100 obtains job information from the client terminal 200 and sends it to the image processing device 300. In the case of reading processing, an input operation is performed in the image processing device 300, and job information is sent from the image processing device 300 to the management server 100. These items of information are only examples. The job information may include information other than the above-described items of information or include none of the above-described items of information.

The job sender/receiver 140 sends and receives an execution request with the client terminal 200 and the image processing device 300. The management server 100 obtains an execution request as in the case of the job information. More specifically, in the case of printing processing, the management server 100 obtains an execution request from the client terminal 200 and sends it to the image processing device 300. In the case of reading processing, the management server 100 obtains an execution request from the image processing device 300. The job sender/receiver 140 is an example of an execution request obtainer.

The device reliability information obtainer 150 obtains reliability information from the image processing device 300. The device reliability information obtainer 150 is an example of a reliability information obtainer. As the reliability information, the installation location, administrator information, and information regarding communication encryption, hard disk drive (HDD), such as a magnetic disk drive, encryption, HDD initialization, and storage of an image log, for example, are obtained. Information regarding the communication encryption refers to whether a communication protocol for encrypting communication between the management server 100 and the image processing device 300 is used. Information regarding the HDD encryption refers to whether data stored in the HDD of the image processing device 300 during the execution of processing is encrypted. Information regarding the HDD initialization refers to whether the data region in the HDD is initialized and whether data stored in the HDD during the execution of processing is erased after processing is executed. The image log is a log storing image data generated during the execution of processing by the image processing device 300. In the case of printing processing, image data indicating a printed image is stored in the image log. In the case of reading processing, image data indicating a read image is stored in the image log.

The job confidentiality-degree determiner 160 determines the degree of confidentiality of data to be processed in response to an execution request (hereinafter called subject data). The degree of confidentiality is determined based on the content of subject data. More specifically, the job confidentiality-degree determiner 160 may determine the degree of confidentiality of subject data according to whether a specific word, such as "confidential", is described on the document name of a document file, which is subject data, for example. The degree of confidentiality may be set in two levels, that is, "HIGH" and "LOW" simply indicating whether or not subject data concerns confidential information. The degree of confidentiality may be set in three levels, that is, "HIGH", "INTERMEDIATE", and "LOW". In this case, "HIGH" represents that the entirety of subject data concerns confidential information, and "INTERMEDIATE" represents that part of subject data concerns confidential information. The degree of confidentiality may be determined by various other approaches in accordance with the system management or the type of subject data. The job confidentiality-degree determiner 160 is an example of a confidentiality-degree determiner.

The device controller 170 judges whether the image processing device 300 is suitable to execute processing in response to an execution request, based on the reliability information obtained by the device reliability information obtainer 150 and the degree of confidentiality determined by the job confidentiality-degree determiner 160. More specifically, the device controller 170 judges, based on the reliability information, whether the image processing device 300 meets the judgement standards which have been set in accordance with the degree of confidentiality of subject data. Based on this judging result, the device controller 170 judges whether the image processing device 300 is suitable to execute processing in response to the execution request. For example, if the image processing device 300 satisfies a specific condition based on the judgement standards, the device controller 170 determines that the image processing device 300 is not suitable to execute processing.

The judgement standards are set in advance in accordance with the assumed items of reliability information and the degree of confidentiality and are stored in a storage device of the management server 100. Upon receiving an execution request to execute processing, the device controller 170 obtains the reliability information from the device reliability information obtainer 150 and refers to the judgement standards stored in the storage device so as to judge whether the image processing device 300 is suitable to execute processing. The judgement standards may alternatively be stored in an external server, and the device controller 170 may obtain the judgement standards when judging whether the image processing device 300 is suitable to execute processing. The judgement standards may alternatively be appended to subject data, and the subject data may be sent from the client terminal 200 to the management server 100. Then, the device controller 170 extracts the judgement standards from the obtained subject data and judges based on the judgement standards whether the image processing device 300 is suitable to execute processing. The device controller 170 is an example of a processing execution judger.

The device controller 170 also controls processing to be executed by the image processing device 300 in accordance with the execution request and the judging result regarding whether the image processing device 300 is suitable to execute processing. More specifically, the device controller 170 generates a control command for controlling the image processing device 300 and sends it to the image processing device 300, together with the execution request and subject data. The content of the control command may indicate that subject data will be printed by masking part of the subject data or that subject data will be printed after a message or a warning indicating that the subject data concerns confidential information is displayed on a display of the image processing device 300. Part of information may be deleted from an execution request or subject data to be sent from the management server 100 to the image processing device 300. For example, the device controller 170 may cause the image processing device 300 to display an execution request by masking the document name of a document file, which is subject data. Additionally, when sending an execution request and subject data from the management server 100 to the image processing device 300, the user name of a user having made the execution request may be deleted from the execution request, or the document name of a document file, which is the subject data, may be deleted from the subject data. As a result of performing the above-described control operation, the information that has been masked or deleted as discussed above is not stored in log data generated in accordance with the processing executed in the image processing device 300. If the device controller 170 has judged that the image processing device 300 is not suitable to execute processing, it does not send subject data to the image processing device 300. The device controller 170 is an example of a processing controller.

[Hardware Configuration of Management Server 100]

Figure 2:
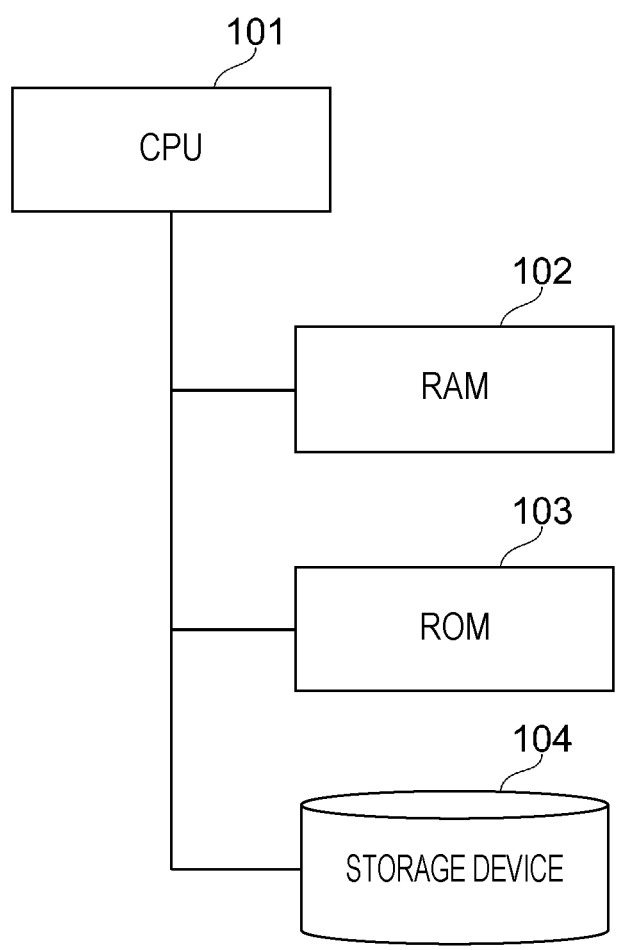
FIG. 2 is a schematic block diagram illustrating an example of the hardware configuration of the management server.

FIG. 2 is a schematic block diagram illustrating an example of the hardware configuration of the management server 100. The management server 100 includes a central processing unit (CPU) 101, which is a processing unit, a random access memory (RAM) 102, a read only memory (ROM) 103, and a storage device 104. The RAM 102 is a main memory and is used as a work memory for the CPU 101 to execute processing. The ROM 103 stores programs and data, such as set values. The CPU 101 can read a program and data directly from the ROM 103 and execute processing. The storage device 104 is a storage for storing programs and data. The CPU 101 reads a program from the storage device 104 into the main memory and executes it. As the storage device 104, a magnetic disk drive or a solid state drive (SSD), for example, is used. The management server 100 also includes a network interface, which is not shown, and exchanges data with the client terminal 200 and the image processing device 300.

In the above-described functional configuration of the management server 100, the device manager 110, the user manager 120, and the job manager 130 are implemented by the CPU 101 executing a program and the RAM 102 or the storage device 104. The job sender/receiver 140 is implemented by the CPU 101 executing a program and the network interface, which is not shown. The functions, which are the device reliability information obtainer 150, the job confidentiality-degree determiner 160, and the device controller 170, are implemented as a result of the CPU 101 executing a program. The management server 100 may not necessarily be constituted by a single hardware unit (server machine, for example), and may be configured by multiple hardware units or virtual machines in a distributed manner.

[Examples of Reliability Information]

FIG. 3 is a table illustrating examples of reliability information. In FIG. 3, concerning four image processing devices 300, identification information (indicated by "ID" in FIG. 3), device name, installation location, administrator, and information regarding communication encryption, HDD encryption, HDD initialization, and the storage of an image log are indicated. As the device name, the name of an organization using the image processing device 300 is indicated. For example, concerning the image processing device 300 having the ID "1", the device name is "COMPANY A—SALES DEPT.", which represents that the image processing device 300 is used in the sales department of Company A. The installation location of this image processing device 300 is "COMPANY A—FIRST FLOOR", and the administrator is "COMPANY A". None of the communication encryption, HDD encryption, and HDD initialization are conducted for this image processing device 300, and the image log is not stored.

[Examples of Judgement Standards Based on Degree of Confidentiality to Judge Whether to Execute Processing]

FIG. 4 is a table illustrating examples of judgement standards based on the degree of confidentiality to judge whether the image processing device 300 is suitable to execute processing. In FIG. 4, the judgement standards are set based on items such as the degree of confidentiality, installation location, administrator, communication encryption, HDD encryption, HDD initialization, and image log. In FIG. 4, the ID represents identification information concerning each judgement standard. Concerning the judging result, "OK" represents that processing will be executed, while "NG" represents that processing will not be executed.

In FIG. 4, the degree of confidentiality of subject data is represented in two levels. "HIGH" represents that the subject data concerns confidential information, while "LOW" represents that the subject data does not concern confidential information. For subject data having the degree of confidentiality "LOW", processing can be executed unconditionally. FIG. 4 thus shows the judgement standards only having the degree of confidentiality "HIGH". Concerning the installation location, "OUTSIDE" represents that the image processing device 300 is installed in the environments where it may be used by users outside the company to which subject data belongs. "IN-HOUSE" represents that the image processing device 300 is installed in the environments where it is used only by in-house users within the company to which subject data belongs. Concerning the administrator, "OUTSIDE" represents that the administrator of the image processing device 300 is a user outside the company to which subject data belongs, while "IN-HOUSE" represents that the administrator of the image processing device 300 is an in-house user within the company to which subject data belongs.

FIG. 4 shows that, if the administrator is "OUTSIDE", the judging result is "NG" regardless of the other conditions (see ID1 and ID2). FIG. 4 also shows that, if the administrator is "IN-HOUSE" and the installation location is "IN-HOUSE", the judging result is "OK" regardless of the other conditions (see ID4).

If the administrator is "IN-HOUSE" and the installation location is "OUTSIDE", the judging result is determined based on the other conditions. If the image log is "YES", it means that, when processing is executed, an image log is stored in the storage of the image processing device 300. In this case, it is possible that the image log be read by an external device and the processing execution result is discovered. Hence, if the image log is "YES", the judging result is "NG" regardless of the other conditions such as communication encryption, HDD encryption, and HDD initialization (see ID3-3).

If the image log is "NO", the judging result is "OK" on the condition that communication encryption, HDD encryption, and HDD initialization are all "YES" (see ID3-2). If the image log is "NO", the judging result is "NG" on the condition that communication encryption, HDD encryption, and HDD initialization are all "NO" (see ID3-1). It is assumed in the examples in FIG. 4 that the operations of these three items, that is, communication encryption, HDD encryption, and HDD initialization, are conducted at the same time as a set of security measures. FIG. 4 thus only shows the case in which the three items are all "YES" or "NO", as indicated by ID3-1 and ID3-2. Alternatively, the operations of these items may be conducted individually. In this case, the judgement standards may be set in greater details, such as when a particular one of the three items is "YES", the judging result is "OK", or when any one (or any two) of the three items is "YES", the judging result is "OK".

The judgement standards shown in FIG. 4 are only examples. Other judgement standards may be used to determine whether processing will be executed. Regarding subject data that does not concern confidential information, that is, subject data having the degree of confidentiality "LOW", judgement may also be made concerning whether to execute processing in accordance with the installation location, settings, and administrator of the image processing device 300. Additionally, not only judgement concerning whether to execute processing, but also judgement concerning whether to execute operation control on the image processing device 300 may be made. For example, it may be determined whether to execute processing by masking information concerning the file name of subject data or concerning the user having provided an instruction to execute processing from information displayed on a user interface (UI) screen of the image processing device 300.

[Functional Configuration of Image Processing Device 300]

Figure 5:
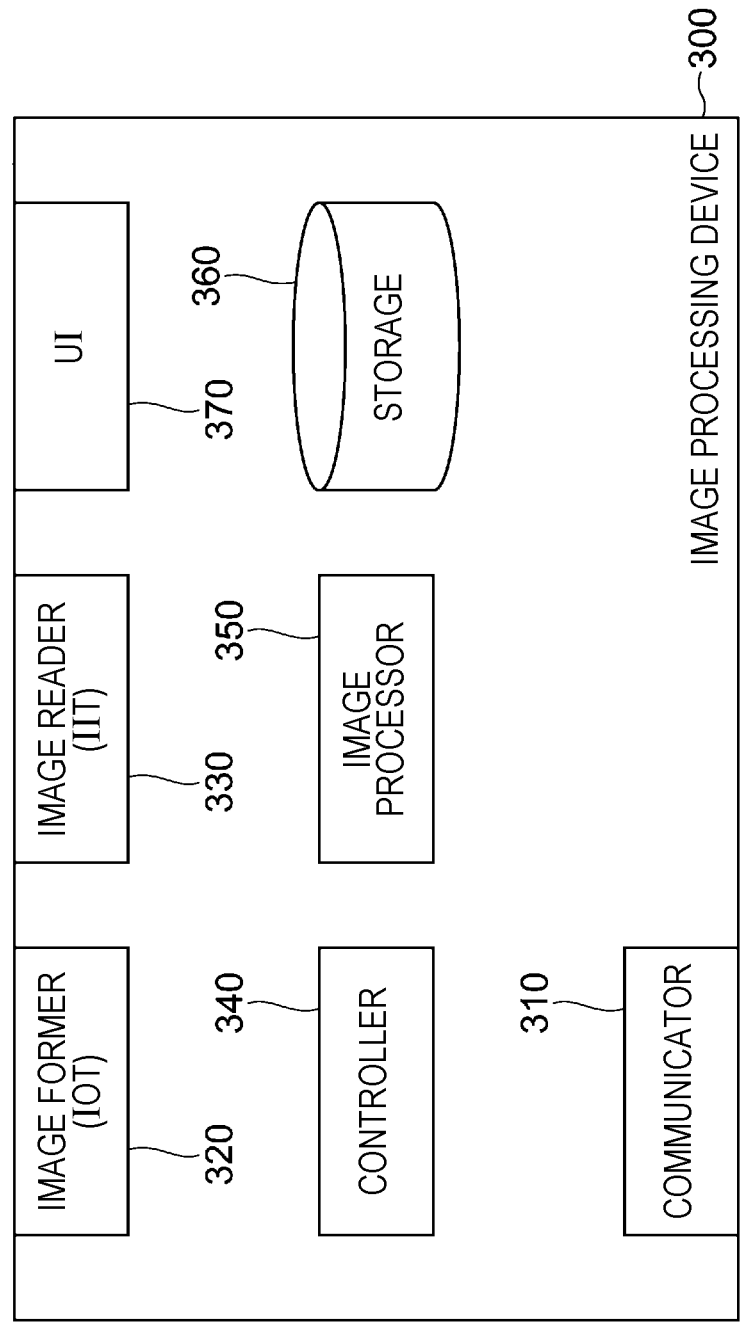
FIG. 5 is a schematic diagram illustrating the functional configuration of an image processing device.

FIG. 5 is a schematic diagram illustrating the functional configuration of the image processing device 300. The image processing device 300 includes a communicator 310, an image former 320, an image reader 330, a controller 340, an image processor 350, a storage 360, and a UI 370.

The communicator 310 is a network interface for connecting to the management server 100 via a network and exchanging data with the management server 100. The connecting medium for a network used in the communicator 310 is not restricted to a particular medium. The communication line may be a wired or wireless medium.

The image former 320 is an image output terminal (IOT). The image former 320 is constituted by a printer and forms an image indicated by image data on a sheet, which is an example of a recording medium, by using an image forming material. To form an image on a recording medium, an electrophotographic system or an inkjet method may be used. In the electrophotographic system, an image is formed by transferring toner attached to a photoconductor drum to a recording medium. In the inkjet method, an image is formed by ejecting ink onto a recording medium.

The image reader 330 is an image input terminal (IIT). The image reader 330, which is constituted by a scanner, optically reads an image of a document set in the scanner to generate a read image (image data). The image reader 330 is a charge coupled device (CCD) scanner or a contact image sensor (CIS) scanner. In a CCD scanner, light applied to a document from a light source and reflected by the document is reduced by a lens and is received by CCDs. In a CIS scanner, light sequentially applied to a document from light emitting diode (LED) light sources and reflected by the document is received by a CIS.

The controller 340 controls the operations of the image processing device 300. More specifically, the controller 340 controls the operations, such as performing communication with an external device by using the communicator 310, executing processing by using the image former 320 and the image reader 330, providing information to a user and receiving an operation from a user by using the UI 370. The controller 340 includes a CPU, which is a processing unit, and a main memory, which is a storage unit. The CPU reads a program into the main memory and executes it. As a result of the CPU executing the program, the above-described control operations are executed.

The image processor 350 executes image processing, such as color correction and scale correction, on an image processed by the image former 320 or the image reader 330.

The storage 360 stores various items of data and programs. More specifically, subject data, such as an image, history data concerning the operations of the image former 320 and the image reader 330, and a program for controlling the operations of the image processing device 300, for example, are stored in the storage 360. As the storage 360, a non-volatile storage, such as a magnetic disk drive or an SSD, is used.

The UI 370 includes a display and an input unit. The display displays screens, such as an operation screen and an information providing screen. The input unit is used by a user to perform an input operation. As a result of the user performing the input operation by using the input unit in accordance with the operation screen displayed on the display, various control commands and control data are input. As the display, a liquid crystal display, for example, is used. As the input unit, hardware keys or a touch sensor, for example, is used. The UI 370 may be constituted by a touchscreen as a combination of a liquid crystal display, which is the display, and a touch sensor, which is the input unit.

[Operation of Image Processing Device 300]

Figure 6:
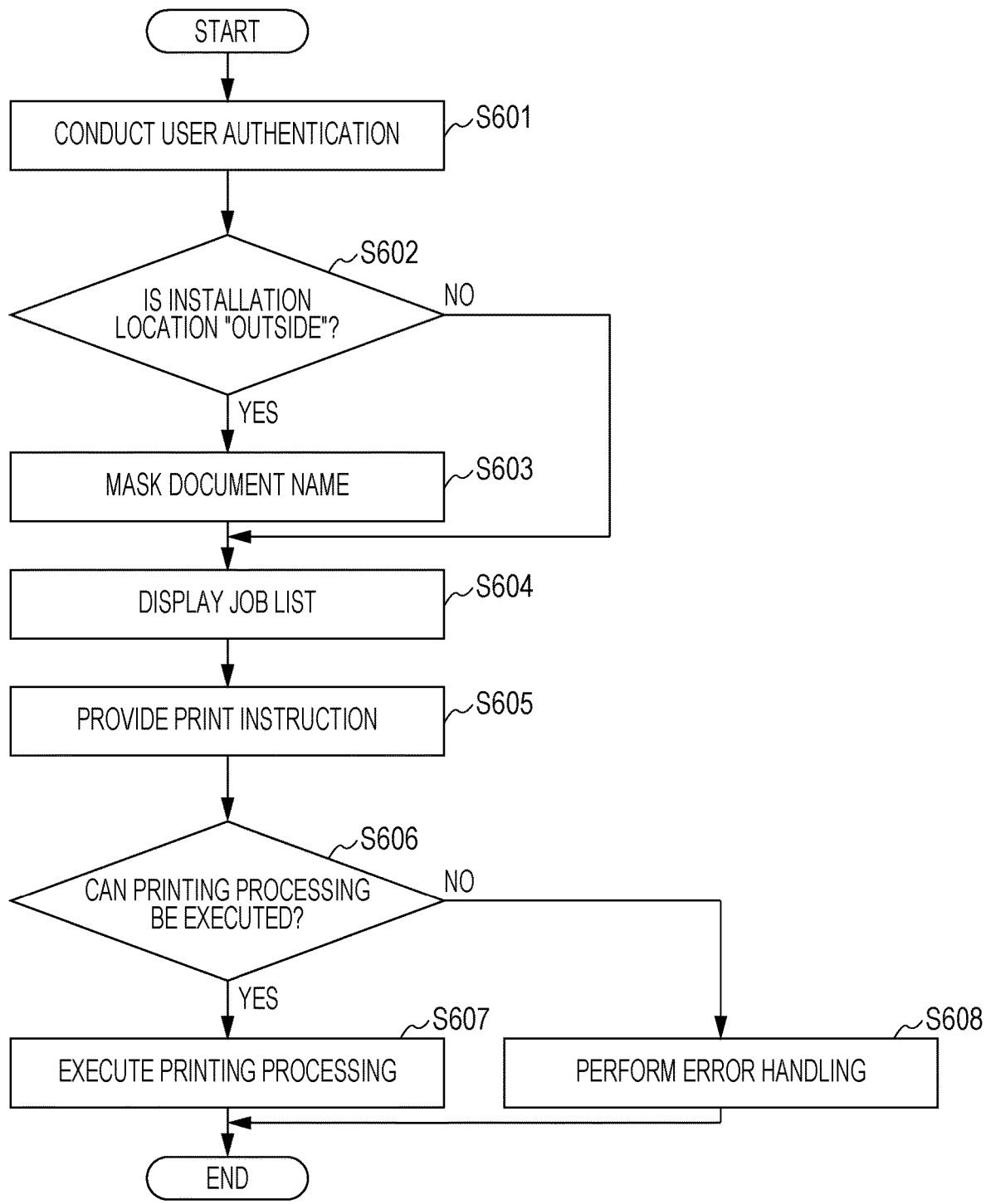
FIG. 6 is a flowchart illustrating an example of the operation of an image processing device when executing printing processing.

FIG. 6 is a flowchart illustrating an example of the operation of the image processing device 300 when executing printing processing. In this operation example, it is assumed that a request to execute printing processing made by a user has been sent from the client terminal 200 to the management server 100 and stored in the job manager 130. It is also assumed that, as a result of the user operating the UI 370 of the image processing device 300, the image processing device 300 starts executing processing based on the request from the user stored in the job manager 130.

In step S601, the image processing device 300 first conducts user authentication. User authentication may be conducted as a result of obtaining authentication information, such as a user ID, from an ID card of the user with the use of a connecting medium, such as near field communication (NFC). User authentication may alternatively be conducted based on authentication information input by the user on an authentication screen displayed on the UI 370. After conducting user authentication, the image processing device 300 is operated under the control of the management server 100 and in accordance with the judgement made by the management server 100.

It is then judged in step S602 whether the installation location of the image processing device 300 is "OUTSIDE" (see FIG. 4). If the installation location of the image processing device 300 is "OUTSIDE", the image processing device 300 masks the document name of a document file, which is subject data, in step S603. The image processing device 300 then displays a job list in step S604. The job list is a list of requests made by the authenticated user to execute processing by using the image processing device 300 selected as the execution device. Requests to execute processing sent from the client terminals 200 by multiple users are managed in the management server 100. If the installation location of the image processing device 300 is found to be "IN-HOUSE" (see FIG. 4) in step S602, the image processing device 300 skips step S603 and displays the job list on the UI 370 in step S604.

In step S605, the user operates the operation screen displayed on the UI 370 of the image processing device 300 and selects an execution request from the job list so as to provide a print instruction to the image processing device 300. The image processing device 300 obtains a judging result regarding whether to execute printing processing from the management server 100. It is determined in step S606 whether the judging result indicates that printing processing can be executed in response to the execution request selected by the user. If it is found in step S606 that printing processing can be executed, the image processing device 300 obtains the execution request and subject data from the management server 100, and executes printing processing based on the obtained execution request and subject data in step S607. If it is found in step S606 that printing processing is unable to be executed, the image processing device 300 performs error handling in step S608 without executing printing processing. In this case, printing processing is not executed, and the subject data is not sent from the management server 100 to the image processing device 300. As error handling performed by the image processing device 300, a message indicating that printing processing is unable to be executed is displayed on the UI 370, for example.

Figure 7:
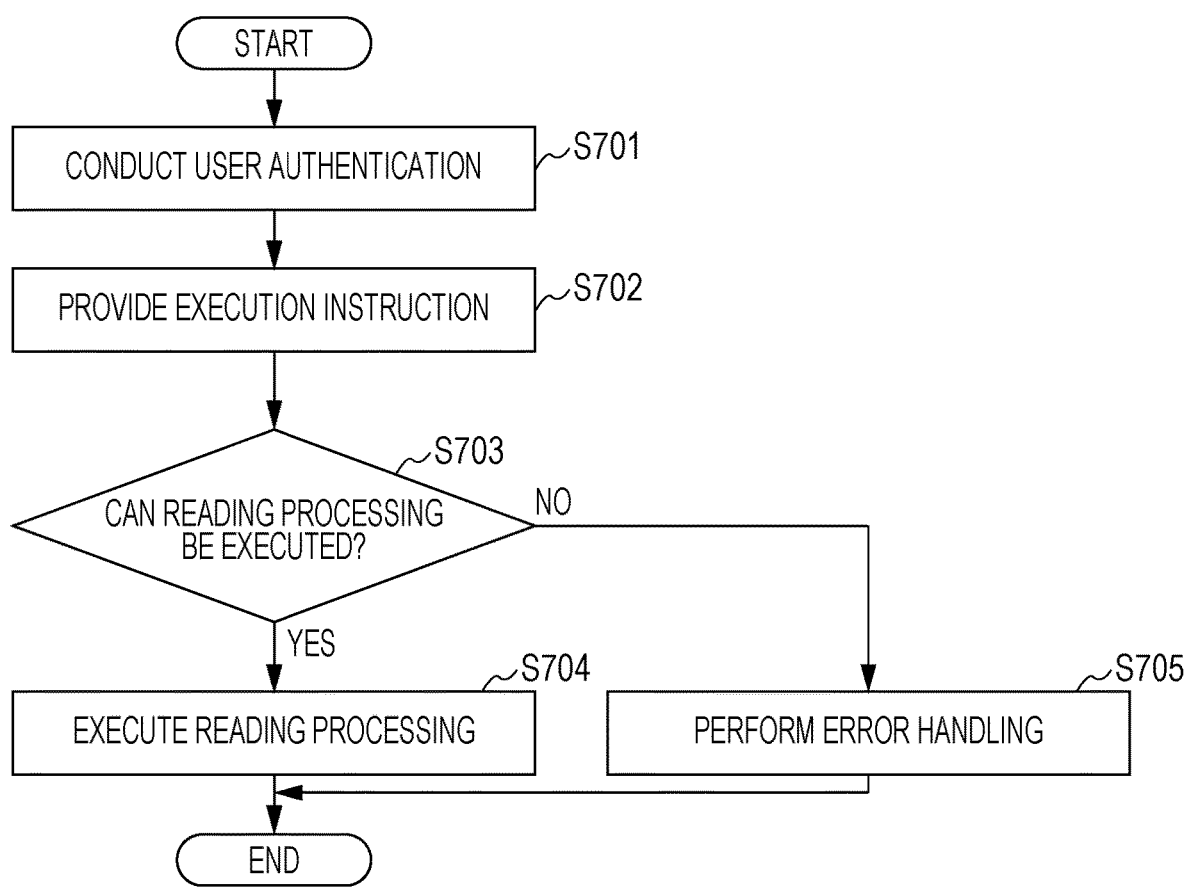
FIG. 7 is a flowchart illustrating an example of the operation of an image processing device when executing reading processing.

FIG. 7 is a flowchart illustrating an example of the operation of the image processing device 300 when executing reading processing. In this operation example, the entire operation including image reading is performed in the image processing device 300. After conducting user authentication by the image processing device 300 in step S701, a user provides an execution instruction by using the operation screen on the UI 370. The image processing device 300 then obtains a judging result regarding whether to execute reading processing from the management server 100. It is determined in step S703 whether the judging result indicates that reading processing can be executed. If it is found in step S703 that reading processing can be executed, the image processing device 300 executes reading processing in response to the execution request in step S704. If it is found in step S703 that reading processing is unable to be executed, the image processing device 300 performs error handling in step S705 without executing reading processing.

[Another Exemplary Embodiment without Using Management Server 100]

In the above-described exemplary embodiment, a request to execute processing by using a selected image processing device 300 is received and managed by the management server 100. The management server 100 then judges whether the image processing device 300 is suitable to execute processing, based on the degree of confidentiality of subject data and the reliability information concerning the image processing device 300. If the management server 100 has judged that the image processing device 300 is not suitable to execute processing, it does not send the subject data to the image processing device 300. In this case, the image processing device 300 is able to obtain the reliability information based on the settings of the image processing device 300. Hence, the following configuration without using the management server 100 may be implemented. Information concerning the degree of confidentiality of subject data is sent from the client terminal 200 to the image processing device 300, and the image processing device 300 judges by itself whether to execute processing without using the management server 100.

Figure 8:
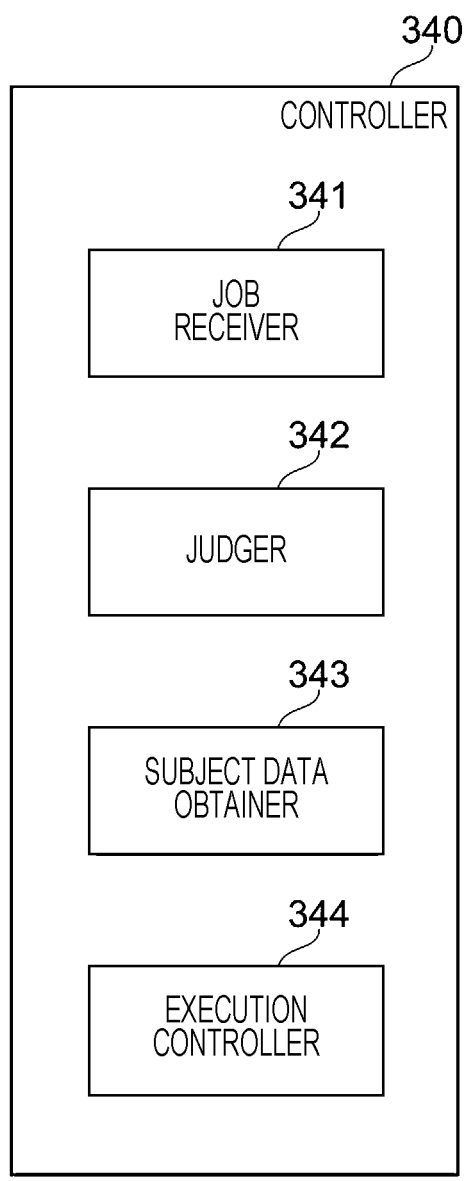
FIG. 8 is a block diagram illustrating the functional configuration of a controller of an image processing device according to another exemplary embodiment when the image processing device judges whether to execute processing.

FIG. 8 is a block diagram illustrating the functional configuration of the controller 340 of the image processing device 300 when the image processing device 300 judges whether to execute processing. In this functional configuration, the controller 340 includes a job receiver 341, a judger 342, a subject data obtainer 343, and an execution controller 344. These functions are implemented as a result of the CPU reading a program and executing it. The individual functions will be explained below, assuming that the image processing device 300 executes printing processing based on subject data.

The job receiver 341 receives from the client terminal 200 a request to execute processing using the image processing device 300 and information concerning the degree of confidentiality of subject data corresponding to the request (hereinafter called confidentiality-degree information). At this time, the subject data is not yet sent from the client terminal 200. The job receiver 341 is an example of a first obtainer.

The judger 342 judges whether the image processing device 300 is suitable to execute processing in response to the request, based on the obtained confidentiality-degree information and the settings of the image processing device 300. The settings of the image processing device 300 correspond to the above-described reliability information, that is, information concerning the installation location and the administrator and the settings regarding communication encryption, HDD encryption, HDD initialization, and storage of an image log, for example. As in judgement made by the device controller 170 of the management server 100, the judger 342 judges that the image processing device 300 is not suitable to execute processing if the settings of the image processing device 300 satisfy a specific condition based on the judgement standards that have been set in accordance with the degree of confidentiality of subject data. The judgement standards may be stored in the storage 360 of the image processing device 300, or may be sent from the client terminal 200 to the image processing device 300, together with an execution request and confidentiality-degree information. The judger 342 is an example of a processing execution judger.

The subject data obtainer 343 obtains subject data if the judger 342 has judged that the image processing device 300 is suitable to execute processing. The subject data may be sent from the client terminal 200 or be obtained from an external device, such as a document server. If the subject data is obtained from an external device, the client terminal 200 sends an instruction to obtain the subject data to the image processing device 300, together with information concerning the storage location of the subject data. The image processing device 300 then accesses the storage location and obtains the subject data. The subject data obtainer 343 is an example of a second obtainer.

The execution controller 344 executes processing on the subject data based on the execution request. The execution controller 344 also changes the mode of processing to be executed on the subject data in accordance with the judging result of the judger 342. The execution controller 344 changes the mode of processing, as in the control operation performed by the device controller 170 of the management server 100. For example, the execution controller 344 causes the image processing device 300 to print the subject data by masking part of the subject data or by displaying a message or a warning indicating that the subject data concerns confidential information on the display of the image processing device 300. The execution controller 344 is an example of a processor.

The exemplary embodiments of the disclosure have been discussed above. The technical scope of the disclosure is not restricted to the above-described exemplary embodiments. For example, the job confidentiality-degree determiner 160 of the management server 100 determines the degree of confidentiality of subject data based on the content of the subject data. Alternatively, as in the configuration discussed with reference to FIG. 8, confidentiality-degree information may be provided from the client terminal 200 to the management server 100. A user may alternatively manually input information concerning the degree of confidentiality by operating the operation screen displayed on the UI 370 of the image processing device 300. Various other modifications and alternatives made to the exemplary embodiments are encompassed within the disclosure without departing from the spirt and scope of the disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    an execution request obtainer that obtains an execution request to execute processing using an image processing device;
    a reliability information obtainer that obtains reliability information concerning reliability of the image processing device, wherein the reliability information includes at least one of:
        a communication encryption indicating whether communication between the image processing device and the information processing apparatus is encrypted,
        a HDD (hard disk drive) encryption indicating whether data stored in a HDD of the image processing device during the execution of processing is encrypted,
        a HDD initialization indicating whether a data region in the HDD is initialized after the execution of processing,
        a storage of an image log indicating whether the image log is stored in the storage of the image processing apparatus, and
        an installation location indicating where the image processing device is installed;
    a confidentiality-degree determiner that determines a degree of confidentiality of subject data to be processed in response to the execution request; and
    a processing execution judger that judges whether the image processing device is suitable to execute processing in response to the execution request, based on the reliability information and the degree of confidentiality,
    wherein the processing execution judger judges whether the image processing device is suitable to execute processing in response to the execution request, based on a judgement standard set in advance for different combinations of values of three or more categories of the reliability information and the degree of confidentiality, the three or more categories of the reliability information including:
        a first category indicating the communication encryption,
        a second category indicating the HDD encryption, and
        a third category indicating the HDD initialization.

2. The information processing apparatus according to claim 1,
    wherein the processing execution judger makes a judgement, based on the reliability information, regarding whether the image processing device meets the judgement standard, and the processing execution judger then judges based on a result of the judgement whether the image processing device is suitable to execute processing in response to the execution request.

3. The information processing apparatus according to claim 2,
wherein the confidentiality-degree determiner determines the degree of confidentiality of the subject data based on content of the subject data.

4. The information processing apparatus according to claim 2,
wherein:
the judgement standard is appended to the subject data; and
the processing execution judger extracts the judgement standard from the subject data and judges by using the extracted judgement standard whether the image processing device is suitable to execute processing in response to the execution request.

5. The information processing apparatus according to claim 2,
wherein, if the image processing device satisfies a specific condition based on the judgement standard, the processing execution judger judges that the image processing device is not suitable to execute processing in response to the execution request.

6. The information processing apparatus according to claim 1, further comprising:
a processing controller that controls processing to be executed by the image processing device in accordance with the execution request and a judging result of the processing execution judger.

7. The information processing apparatus according to claim 6,
wherein the processing controller generates a control command for controlling the image processing device and sends the control command to the image processing device, together with the execution request and the subject data.

8. The information processing apparatus according to claim 6,
wherein the processing controller does not send the subject data to the image processing device if it is judged that the image processing device is not suitable to execute processing in response to the execution request.

9. An image processing device comprising:
a first obtainer that obtains, from an information processing apparatus, an execution request to execute processing using the image processing device and also obtains confidentiality-degree information indicating a degree of confidentiality of subject data to be processed in response to the execution request;
a processing execution judger that judges whether the image processing device is suitable to execute processing on the subject data in response to the execution request, based on the degree of confidentiality and settings of the image processing device, wherein the settings of the image processing device include at least one of:
a communication encryption indicating whether communication between the image processing device and the information processing apparatus is encrypted,
a HDD (hard disk drive) encryption indicating whether data stored in a HDD of the image processing device during the execution of processing is encrypted,
a HDD initialization indicating whether a data region in the HDD is initialized after the execution of processing,
a storage of an image log indicating whether the image log is stored in the storage of the image processing apparatus, and
an installation location indicating where the image processing device is installed;
a second obtainer that obtains the subject data if the processing execution judger has judged that the image processing device is suitable to execute processing on the subject data; and
a processor that executes processing on the subject data based on the execution request,
wherein the processing execution judger judges whether the image processing device is suitable to execute processing on the subject data in response to the execution request, based on a judgement standard set in advance for different combinations of values of three or more categories of the settings of the image processing device and the degree of confidentiality, the three or more categories of the settings of the image processing device including:
a first category indicating the communication encryption,
a second category indicating the HDD encryption, and
a third category indicating the HDD initialization.

10. The image processing device according to claim 9,
wherein the processor changes a mode of processing to be executed on the subject data in accordance with the execution request and a judging result of the processing execution judger.

11. The image processing device according to claim 9,
wherein, if the settings of the image processing device satisfy a specific condition based on the judgement standard, the processing execution judger judges that the image processing device is not suitable to execute processing in response to the execution request.

12. An information processing apparatus comprising:
execution request obtaining means for obtaining an execution request to execute processing using an image processing device;
reliability information obtaining means for obtaining reliability information concerning reliability of the image processing device, wherein the reliability information includes at least one of:
a communication encryption indicating whether communication between the image processing device and the information processing apparatus is encrypted,
a HDD (hard disk drive) encryption indicating whether data stored in a HDD of the image processing device during the execution of processing is encrypted,
a HDD initialization indicating whether a data region in the HDD is initialized after the execution of processing,
a storage of an image log indicating whether the image log is stored in the storage of the image processing apparatus, and
an installation location indicating where the image processing device is installed;
confidentiality-degree determining means for determining a degree of confidentiality of subject data to be processed in response to the execution request; and
processing execution judging means for judging whether the image processing device is suitable to execute processing in response to the execution request, based on the reliability information and the degree of confidentiality, wherein the processing execution judging means judges whether the image processing device is suitable to execute processing in response to the execution request, based on a judgement standard set in advance for different combinations of values of three or more categories of the reliability information and the degree of confidentiality, the three or more categories of the reliability information including:

a first category indicating the communication encryption, a second category indicating HDD encryption, and a third category indicating HDD initialization.

* * * * *